(12) United States Patent
Kono et al.

(10) Patent No.: US 11,789,609 B2
(45) Date of Patent: *Oct. 17, 2023

(54) ALLOCATING MEMORY AND REDIRECTING MEMORY WRITES IN A CLOUD COMPUTING SYSTEM BASED ON TEMPERATURE OF MEMORY MODULES

(71) Applicant: Microsoft Technology Licensing, LLC, Redmond, WA (US)

(72) Inventors: Raymond-Noel Nkoulou Kono, Snoqualmie, WA (US); Nisha Susan John, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,439

(22) Filed: Sep. 1, 2022

(65) Prior Publication Data

US 2023/0004295 A1     Jan. 5, 2023

Related U.S. Application Data

(63) Continuation of application No. 16/915,303, filed on Jun. 29, 2020, now Pat. No. 11,467,729.

(51) Int. Cl.
*G06F 3/06* (2006.01)
*H04L 67/10* (2022.01)

(52) U.S. Cl.
CPC ........... *G06F 3/0604* (2013.01); *G06F 3/067* (2013.01); *G06F 3/0653* (2013.01); *G06F 3/0655* (2013.01); *H04L 67/10* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| 8,910,152 B1 * | 12/2014 | Hyser | G06F 9/45558 |
| | | | 718/1 |
| 11,467,729 B2 * | 10/2022 | Kono | G06F 9/5094 |

(Continued)

OTHER PUBLICATIONS

M. Liu and T. Li, "Optimizing virtual machine consolidation performance on NUMA server architecture for cloud workloads," 2014 ACM/IEEE 41st International Symposium on Computer Architecture (ISCA), Minneapolis, MN, USA, 2014, pp. 325-336, doi: 10.1109/ISCA.2014.6853224. (Year: 2014).*

(Continued)

*Primary Examiner* — Daniel C. Chappell
(74) *Attorney, Agent, or Firm* — Ranjeev Singh; Singh Law, PLLC (57) ABSTRACT

Systems and methods for allocating memory and redirecting data writes based on temperature of memory modules in a cloud computing system are described. A method includes maintaining temperature profiles for a first plurality of memory modules and a second plurality of memory modules. The method includes automatically redirecting a first request to write to memory from a first compute entity being executed by the first processor to a selected one of a first plurality of memory chips, whose temperature does not meet or exceed the temperature threshold, included in at least the first plurality of memory modules and automatically redirecting a second request to write to memory from a second compute entity being executed by the second processor to a selected one of the second plurality of memory chips, whose temperature does not meet or exceed the temperature threshold, included in at least the second plurality of memory modules.

20 Claims, 7 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 2015/0058521 A1* | 2/2015 | Armstrong | G06F 9/45533 711/6 |
| 2019/0220217 A1* | 7/2019 | Kimmel | G06F 3/0649 |
| 2019/0235765 A1* | 8/2019 | Crawford | G06Q 10/107 |
| 2019/0324690 A1* | 10/2019 | Jin | G06F 12/0292 |

OTHER PUBLICATIONS

G. Zhu, K. Lu, X. Wang, Y. Zhang, P. Zhang and S. Mittal, "SwapX: An NVM-Based Hierarchical Swapping Framework," in IEEE Access, vol. 5, pp. 16383-16392, 2017, doi: 10.1109/ACCESS.2017.2737634. (Year: 2017).*

J. V. Wang, C.-T. Cheng and C. K. Tse, "A power and thermal-aware virtual machine allocation mechanism for Cloud data centers," 2015 IEEE International Conference on Communication Workshop (ICCW), London, UK, 2015, pp. 2850-2855, doi: 10.1109/ICCW.2015.7247611. (Year: 2015).*

* cited by examiner

```
┌─────────────────────────────────────────────────────────────────────────┐
│ MAINTAINING A FIRST TEMPERATURE PROFILE BASED ON INFORMATION RECEIVED   │
│ FROM A THERMAL SENSOR ASSOCIATED WITH EACH OF A FIRST PLURALITY OF      │
│ MEMORY CHIPS INCLUDED IN AT LEAST A FIRST PLURALITY OF MEMORY MODULES   │
└─────────────────────────────────────────────────────────────────────────┘
                                    │
                                    ▼                              610
┌─────────────────────────────────────────────────────────────────────────┐
│ MAINTAINING A SECOND TEMPERATURE PROFILE BASED ON INFORMATION RECEIVED  │
│ FROM A THERMAL SENSOR ASSOCIATED WITH EACH OF A SECOND PLURALITY OF     │
│ MEMORY CHIPS INCLUDED IN AT LEAST A SECOND PLURALITY OF MEMORY MODULES  │
└─────────────────────────────────────────────────────────────────────────┘
                                    │
                                    ▼                              620
┌─────────────────────────────────────────────────────────────────────────┐
│ BASED ON AT LEAST THE FIRST TEMPERATURE PROFILE, AUTOMATICALLY          │
│ REDIRECTING A FIRST REQUEST TO WRITE TO MEMORY FROM A FIRST COMPUTE     │
│ ENTITY BEING EXECUTED BY A FIRST PROCESSOR TO A SELECTED ONE OF THE     │
│ FIRST PLURALITY OF MEMORY CHIPS, WHOSE TEMPERATURE DOES NOT MEET OR     │
│ EXCEED THE TEMPERATURE THRESHOLD, INCLUDED IN AT LEAST THE FIRST        │
│ PLURALITY OF MEMORY MODULES                                             │
└─────────────────────────────────────────────────────────────────────────┘
                                    │
                                    ▼                              630
┌─────────────────────────────────────────────────────────────────────────┐
│ BASED ON AT LEAST THE SECOND TEMPERATURE PROFILE, AUTOMATICALLY         │
│ REDIRECTING A SECOND REQUEST TO WRITE TO MEMORY FROM A SECOND COMPUTE   │
│ ENTITY BEING EXECUTED BY A SECOND PROCESSOR TO A SELECTED ONE OF THE    │
│ SECOND PLURALITY OF MEMORY CHIPS, WHOSE TEMPERATURE DOES NOT MEET OR    │
│ EXCEED THE TEMPERATURE THRESHOLD, INCLUDED IN AT LEAST THE SECOND       │
│ PLURALITY OF MEMORY MODULES                                             │
└─────────────────────────────────────────────────────────────────────────┘
                                  600                              640
```

FIG. 6

MAINTAINING A FIRST TEMPERATURE PROFILE BASED ON INFORMATION RECEIVED FROM A THERMAL SENSOR ASSOCIATED WITH EACH OF A FIRST MEMORY PLURALITY OF CHIPS INCLUDED IN AT LEAST A FIRST PLURALITY OF MEMORY MODULES AND AT LEAST A SECOND PLURALITY OF MEMORY MODULES ~710

MAINTAINING A SECOND TEMPERATURE PROFILE BASED ON INFORMATION RECEIVED FROM A THERMAL SENSOR ASSOCIATED WITH EACH OF A SECOND PLURALITY OF MEMORY CHIPS INCLUDED IN AT LEAST A THIRD PLURALITY OF MEMORY MODULES AND AT LEAST A FOURTH PLURALITY OF MEMORY MODULES ~720

BASED ON AT LEAST THE FIRST TEMPERATURE PROFILE, AUTOMATICALLY REDIRECTING A FIRST REQUEST TO WRITE TO MEMORY FROM A FIRST COMPUTE ENTITY BEING EXECUTED BY A FIRST PROCESSOR TO A SELECTED ONE OF THE FIRST PLURALITY OF MEMORY CHIPS, WHOSE TEMPERATURE DOES NOT MEET OR EXCEED THE TEMPERATURE THRESHOLD, INCLUDED IN AT LEAST THE FIRST PLURALITY OF MEMORY MODULES AND THE AT LEAST THE SECOND PLURALITY OF MEMORY MODULES ~730

BASED ON AT LEAST THE SECOND TEMPERATURE PROFILE, AUTOMATICALLY REDIRECTING A SECOND REQUEST TO WRITE TO MEMORY FROM A SECOND COMPUTE ENTITY BEING EXECUTED BY A SECOND PROCESSOR TO A SELECTED ONE OF THE SECOND PLURALITY OF MEMORY CHIPS, WHOSE TEMPERATURE DOES NOT MEET OR EXCEED THE TEMPERATURE THRESHOLD, INCLUDED IN AT LEAST THE THIRD PLURALITY OF MEMORY MODULES AND THE FOURTH PLURALITY OF MEMORY MODULES ~740

UPON DETERMINING A TEMPERATURE OF N OF THE FIRST PLURALITY OF MEMORY CHIPS MEETS OR EXCEEDS A TEMPERATURE THRESHOLD, AUTOMATICALLY MIGRATING AT LEAST A SUBSET OF THE FIRST COMPUTE ENTITIES FROM A FIRST HOST SERVER TO A SECOND HOST SERVER PROVIDED AT LEAST A TEMPERATURE OF AT LEAST ONE MEMORY CHIP FROM AMONG THE SECOND PLURALITY OF MEMORY CHIPS DOES NOT MEET OR EXCEED THE TEMPERATURE THRESHOLD ~750

ALLOCATING MEMORY AND REDIRECTING MEMORY WRITES IN A CLOUD COMPUTING SYSTEM BASED ON TEMPERATURE OF MEMORY MODULES

CROSS-REFERENCE TO RELATED APPLICATION(S)

This application is a continuation of U.S. patent application Ser. No. 16/915,303, filed on Jun. 29, 2020, entitled "ALLOCATING MEMORY AND REDIRECTING MEMORY WRITES IN A CLOUD COMPUTING SYSTEM BASED ON TEMPERATURE OF MEMORY MODULES," the entire contents of which are hereby incorporated herein by reference.

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers.

There is a need for methods and systems to improve the reliability of the memory modules used in cloud computing systems.

SUMMARY

One aspect of the present disclosure relates to a method in a cloud computing system including a host server, where the host server comprises at least a first plurality of memory modules coupled to a first processor and at least a second plurality of memory modules coupled to a second processor. The method may include maintaining a first temperature profile based on information received from a thermal sensor associated with each of a first plurality of memory chips included in at least the first plurality of memory modules. The method may further include maintaining a second temperature profile based on information received from a thermal sensor associated with each of a second plurality of memory chips included in at least the second plurality of memory modules. The method may further include based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules. The method may further include based on at least the second temperature profile, automatically redirecting a second request to write to memory from a second compute entity being executed by the second processor to a selected one of the second plurality of memory chips, whose temperature does not meet or exceed the temperature threshold, included in at least the second plurality of memory modules.

In yet another aspect, the present disclosure relates to a system including a host server comprising at least a first plurality of memory modules coupled to a first processor and at least a second plurality of memory modules coupled to a second processor. The system may further include a hypervisor, associated with the host server. The hypervisor may be configured to: (1) maintain a first temperature profile based on information received from a thermal sensor associated with each of a first plurality of memory chips included in at least the first plurality of memory modules, (2) maintain a second temperature profile based on information received from a thermal sensor associated with each of a second plurality of memory chips included in at least the second plurality of memory modules, (3) based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules, and (4) based on at least the second temperature profile, automatically redirecting a second request to write to memory from a second compute entity being executed by the second processor to a selected one of the second plurality of memory chips, whose temperature does not meet or exceed the temperature threshold, included in at least the second plurality of memory modules.

In another aspect, the present disclosure relates to a method in a cloud computing system including a first host server and a second host server, where the first host server comprises at least a first plurality of memory modules coupled to a first processor and at least a second plurality of memory modules coupled to a second processor, where the second host server comprises at least a third plurality of memory modules coupled to a third processor and at least a fourth plurality of memory modules coupled to a fourth processor, where the first host server comprises a first hypervisor for managing a first plurality of compute entities for execution by the first processor or the second processor and the second host server comprises a second hypervisor for managing a second plurality of compute entities for execution by the third processor or the fourth processor. The method may include maintaining a first temperature profile based on information received from a thermal sensor associated with each of a first plurality of memory chips included in at least the first plurality of memory modules and at least the second plurality of memory modules. The method may further include maintaining a second temperature profile based on information received from a thermal sensor associated with each of a second plurality of memory chips included in at least the third plurality of memory modules and at least the fourth plurality of memory modules. The method may further include based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules and at least the second plurality of memory modules. The method may further include based on at least the second temperature profile, automatically redirecting a second request to write to memory from a second compute entity being executed by the second processor to a selected one of the second plurality of memory chips, whose temperature does not meet or exceed the temperature threshold, included in at least the third plurality of memory modules and the fourth plurality of memory modules. The method may further include upon determining a temperature of at least N of the first plurality of memory chips meets or exceeds a temperature threshold, wherein N is a positive integer, automatically migrating at least a subset of the first compute entities from the first host server to the second host server provided at least a temperature of at least one memory chip from among the second plurality of memory chips does not meet or exceed the temperature threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 7 shows another flowchart of a method in accordance with one example.

DETAILED DESCRIPTION

Examples described in this disclosure relate to allocating memory and redirecting data writes based on temperature of memory modules in a cloud computing system. The memory modules may be included in a host server. Multiple host servers may be included in a rack of servers or a stack of servers. The host server may be any server in a cloud computing environment that is configured to serve tenants or other subscribers of the cloud computing service. Example memory technologies include, but are not limited to, volatile-memory technologies, non-volatile memory technologies, and quasi-volatile memory technologies. Example memory types include dynamic random access memory (DRAM), flash memory (e.g., NAND flash), ferroelectric random-access memory (FeRAM), magnetic random-access memory (MRAM), phase-change memory (PCM), and resistive random-access memory (RRAM). Broadly speaking, the present disclosure relates to increasing the reliability and uptime of any servers that have memory based on a technology that is susceptible to breakdown or failure because of heat and overuse.

In certain examples, the methods and systems described herein may be deployed in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Figure 1:
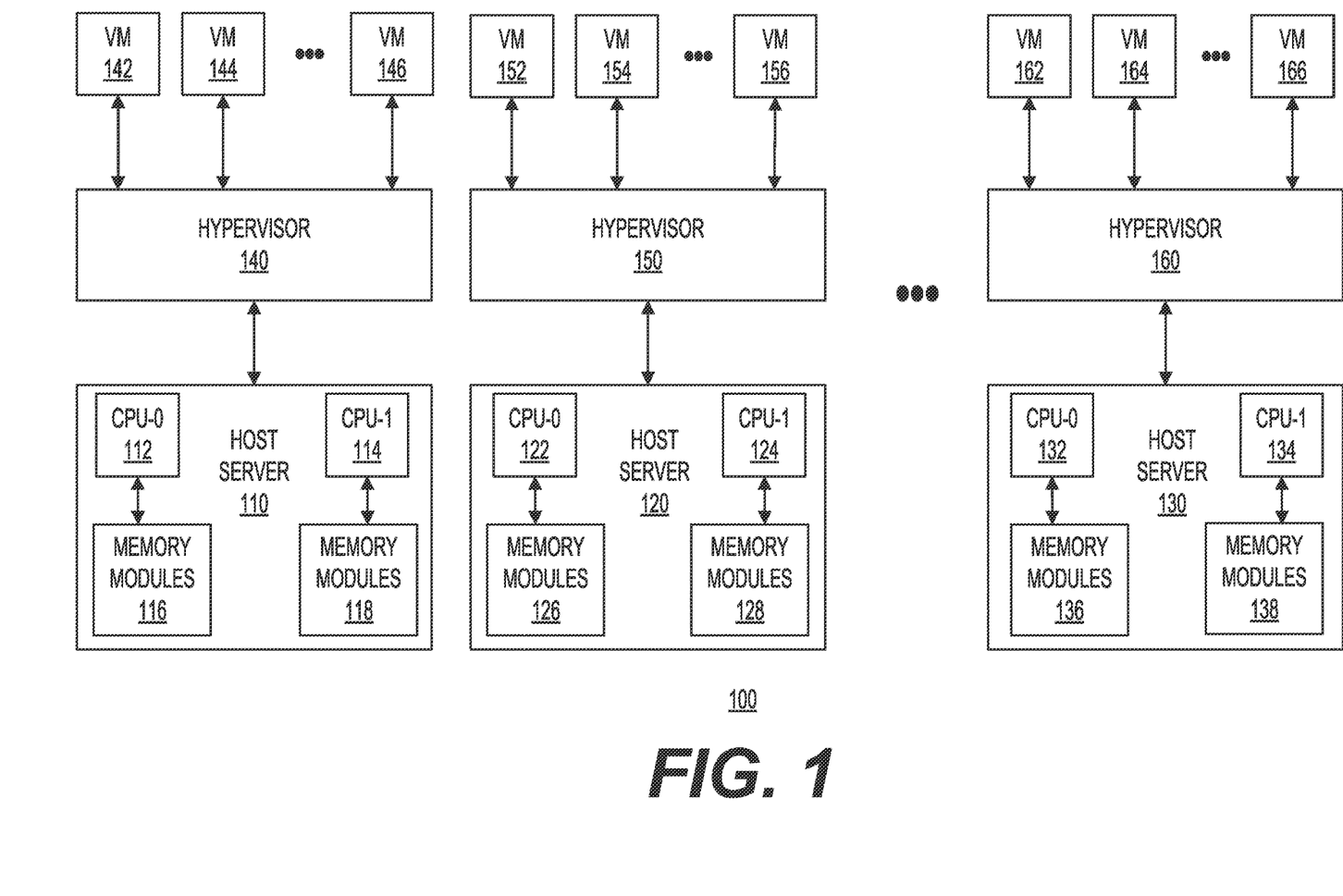
FIG. 1 shows a system for controlling memory allocation and data writes in a cloud computing system in accordance with one example.

FIG. 1 shows a system 100 for controlling memory allocation and data writes in a cloud computing system in accordance with one example. In this example, system 100 may correspond to a cloud computing stack in a data center. System 100 may be implemented as a rack of servers. In this example, system 100 may include host servers 110, 120, and 130. Each of the host servers may include one or more processors configured to provide at least some form of compute functionality. As an example, host server 110 may include CPU-0 112 and CPU-1 114, host server 120 may include CPU-0 122 and CPU-1 124, and host server 130 may include CPU-0 132 and CPU-1 134. Host server 110 may further include memory modules 116 and 118. Host server 120 may further include memory modules 126 and 128. Host server 130 may further include memory modules 136 and 138.

With continued reference to FIG. 1, host server 110 may be configured to execute instructions corresponding to hypervisor 140. Hypervisor 140 may further be configured to interface with virtual machines (VMs) (e.g., VM 142, 144, and VM 146). Instructions corresponding to the VMs may be executed using either of CPU-0 112 or CPU-1 114 associated with host server 110. Hypervisor 150 may further be configured to interface with virtual machines (VMs) (e.g., VM 152, 154, and VM 156). Instructions corresponding to these VMs may be executed using either of CPU-0 122 or CPU-1 124 associated with host 120. Hypervisor 160 may further be configured to interface with virtual machines (VMs) (e.g., VM 162, 164, and VM 166). Instructions corresponding to these VMs may be executed using either of CPU-0 132 or CPU-1 134 associated with host server 130.

Hypervisor 140 may share control information with hypervisor 150 via a control path. The control path may correspond to a path implemented using a bus system (e.g., a server rack bus system or other types of bus systems). Hypervisor 150 may share control information with hypervisor 160 via another control path. The control path may correspond to a path implemented using a bus system (e.g., a server rack bus system or other types of bus systems). Each of hypervisor 140, hypervisor 150, and hypervisor 160 may be a kernel-based virtual machine (KVM) hypervisor, a Hyper-V hypervisor, or another type of hypervisor. Although FIG. 1 shows system 100 as including a certain number of components arranged and coupled in a certain way, it may include fewer or additional components arranged and coupled differently. As an example, although not shown in FIG. 1, each host server may include an operating system for managing certain aspects of the host server. As another example, system 100 may include any number of host servers combined as part of a rack or a stack. As another example, each host server may include any number of CPUs, GPUs, memory modules, or other components, as needed for providing cloud computing, storage, and/or networking functions. In addition, the functionality associated with system 100 may be distributed or combined, as needed. Moreover, although FIG. 1 describes the access to the host server's memory by VMs, other types of compute entities, such as containers, micro-VMs, microservices, and unikernels for serverless functions, may access the memory in a like manner. As used herein, the term "compute entity" encompasses, but is not limited to, any executable code (in the form of hardware, firmware, software, or in any combination of the foregoing) that implements a functionality, an application, a service, a micro-service, a container, a unikernel for serverless computing, or a part of the aforementioned.

Figure 2:
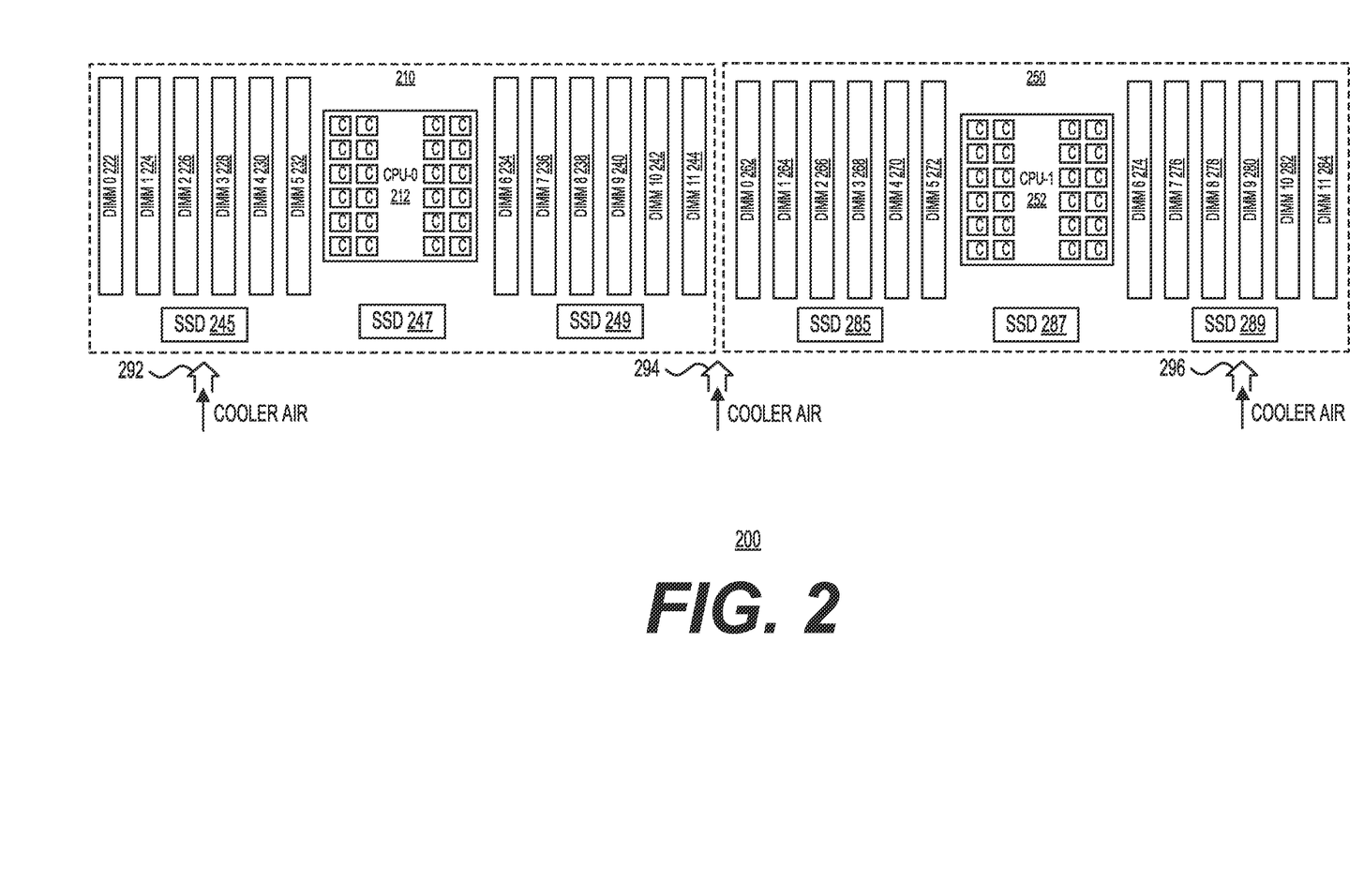
FIG. 2 shows a block diagram of a server in accordance with one example.

FIG. 2 shows a block diagram of a server 200 for implementing a host server (e.g., any of host server 110, host server 120, or host server 130) in accordance with one example. Server 200 may include server board 210 and server board 250. Server board 210 and server board 250 may be coupled via interconnects, high speed cables, a bus system associated with a rack, or another structure for housing server board 210 and server board 250. Server board 210 may include CPU-0 212, Dual-Inline Memory Modules (DIMMs) (e.g., DIMMs shown in FIG. 2 as part of server board 210), and Solid-State Drives (SSDs) 245, 247, and 249. In this example, CPU-0 212 may include 24 cores (identified as blocks with capitalized letter C in FIG. 2). Each of the DIMMs may be installed in a DIMM slot/connector. In this example, six DIMMs may be arranged on one side of CPU-0 212 and another six DIMMs may be arranged on the other side of CPU-0 212. In this example, DIMM 0 222, DIMM 1 224, DIMM 2 226, DIMM 3 228, DIMM 4 230, and DIMM 5 232 may be arranged on the left side of CPU-0 212. DIMM 6 234, DIMM 7 236, DIMM 8 238, DIMM 9 240, DIMM 10 242, and DIMM 11 244 may be arranged on the right-hand side of CPU-0 212.

With continued reference to FIG. 2, server board 250 may include CPU-1 252, Dual-Inline Memory Modules (DIMMs) (e.g., DIMMs shown in FIG. 2 as part of server board 250), and Solid-State Drives (SSDs) 285, 287, and 289. In this example, CPU-1 252 may include 24 cores (identified as blocks with capitalized letter C in FIG. 2). Each of the DIMMs may be installed in a DIMM slot/connector. In this example, six DIMMs may be arranged on one side of CPU-1 252 and another six DIMMs may be arranged on the other side of CPU-1 252. In this example, DIMM 0 262, DIMM 1 264, DIMM 2 266, DIMM 3 268, DIMM 4 270, and DIMM 5 272 may be arranged on the left side of CPU-1 252. DIMM 6 274, DIMM 7 276, DIMM 8 278, DIMM 9 280, DIMM 10 282, and DIMM 11 284 may be arranged on the right-hand side of CPU-1 252.

Still referring to FIG. 2, in this example, server 200 may be cooled using cooled air. As an example, cooled air may be provided, using inlets 292, 294, and 296, to various portions of server board 210 and server board 250. Although in FIG. 2, the cooling is accomplished using cooled air, liquids or other forms of matter may also be used to cool server 200. Regardless of the cooling methods used, the various components incorporated in server 200 may have different temperatures. The non-uniformity of the temperature for the components may stem from several reasons. As an example, certain components mounted on any of server boards 210 and 250 may generate more heat than the other components. As another example, the cooled air received by some downstream components may be pre-heated by the upstream components (e.g., the SSDs shown in FIG. 2). In addition, the number and the arrangement of inlets may create non-uniform temperature inside a server rack, or another structure used for housing server boards 210 and 250. The DIMMs may also experience non-uniform temperatures. Although FIG. 2 shows server 200 as including a certain number of components arranged and coupled in a certain way, it may include fewer or additional components arranged and coupled differently. As an example, server 200 may include any number of server boards arranged inside a rack or any other structure. As another example, each server board may include any number of CPUs, GPUs, memory modules, or other components, as needed for providing computing, storage, and/or networking functions. In addition, although server boards 210 and 250 are described as having DIMMs, other types of memory modules may instead be included as part of server boards 210 and 250. As an example, such memory modules may be Single-Inline Memory Modules (SIMMs).

Figure 3:
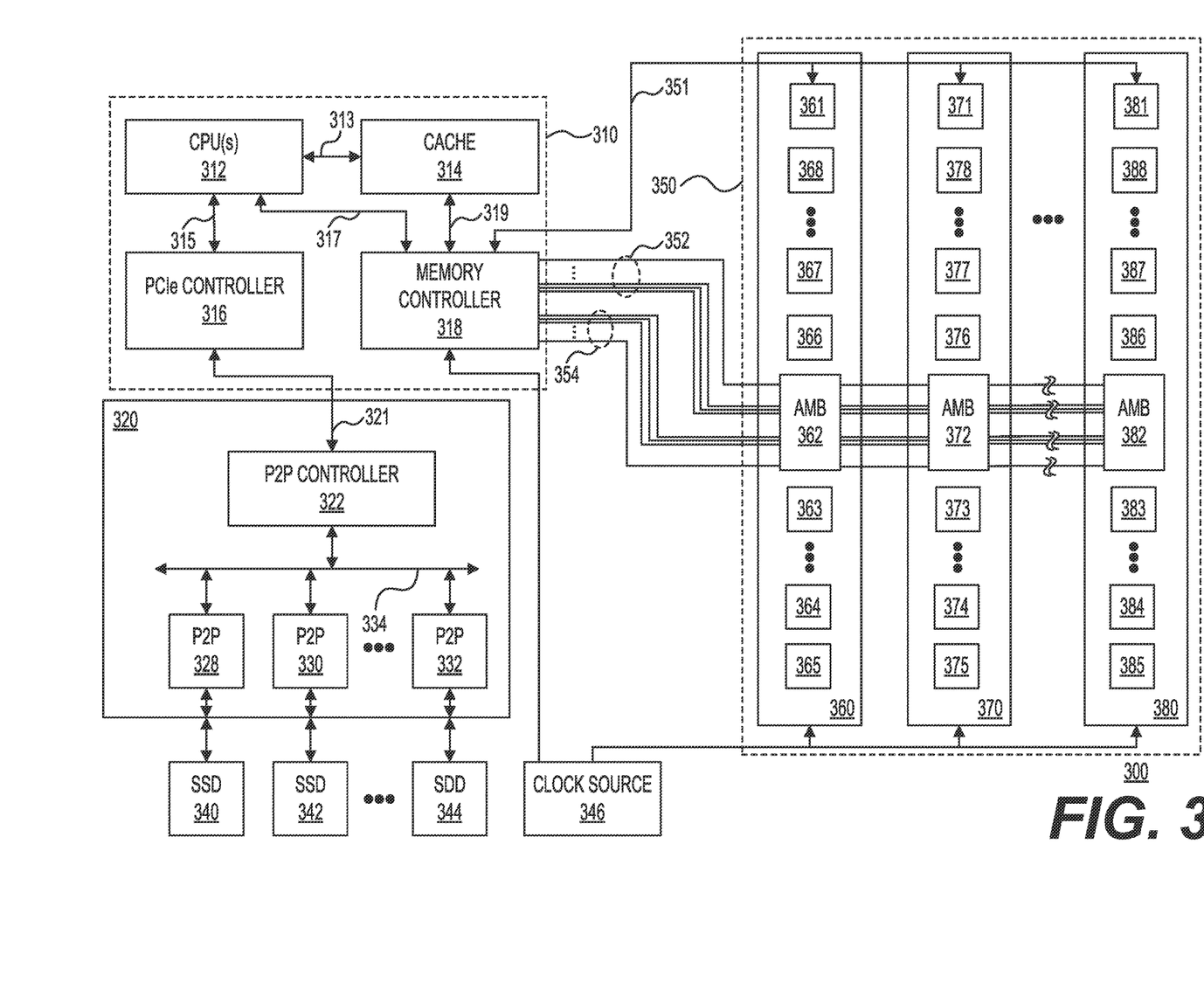
FIG. 3 shows a host server including memory modules in accordance with one example.

FIG. 3 shows a host server 300 including memory modules 350 in accordance with one example. Host server 300 may include a portion 310. In this example, portion 310 may correspond to a part of host server 300 that includes central processing functionality and bus/memory controllers. As an example, portion 310 may include CPU(s) 312, cache 314, Peripheral Component Interconnect express (PCIe) controller 316, and memory controller (MC) 318. CPU(s) 312 may be coupled to cache 314, via bus 313, to allow fast access to cached instructions or data. CPU(s) 312 may also be coupled to PCIe controller 316 via a bus 315. CPU(s) 312 may also be coupled to a memory controller 318 via a bus 317. Cache 314 may be coupled to memory controller 318 via bus 319. In one example, CPU(s) 312, cache 314, and PCIe controller 316 may be incorporated in a single module (e.g., a CPU module).

PCIe controller 316 may be coupled to a PCIe bridge 320 via a PCIe bus 321. PCIe Bridge 320 may include a peer to peer (P2P) controller 322. PCIe bridge 320 may also provide the functionality associated with a PCIe controller and other functionality, as needed, to enable interfacing with various storage and/or networking resources. In this example, P2P controller 322 may be coupled via bus 334 to P2P ports, including P2P 328, P2P 330, and P2P 332. In this example, P2P 328 may be coupled to SSD 340, P2P 330 may be coupled to SSD 342, and P2P 332 may be coupled to SSD 344.

With continued reference to FIG. 3, memory controller 318 may be coupled via busses 352 and 354 to memory modules 350. In this example, the coupling to the memory modules may be made via advanced memory buffers (e.g., AMBs 362, 372, and 382). In addition, in this example, bus 352 may transfer data/control/status signals from memory controller 318 to memory modules 350 and bus 354 may transfer data/control/status signals from memory modules 350 to memory controller 318. In addition, clock source 346 may be used to synchronize signals, as needed. Clock source 346 may be implemented as a phase-locked loop (PLL) circuit or another type of clocking circuit.

Each of memory modules 360, 370, and 380 may be a DIMM, as described earlier. Memory module 360 may include memory chips 363, 364, 365, 366, 367, and 368. Memory module 360 may further include a memory module controller (MMC) 361. Memory module 370 may include memory chips 373, 374, 375, 376, 377, and 378. Memory module 370 may further include an MMC 371. Memory module 380 may include memory chips 383, 384, 385, 386, 387, and 388. Memory module 380 may further include an MMC 381. Each memory chip may include a temperature sensor (not shown) for continuously monitoring and tracking of the temperature inside the memory chip. Such temperature sensors may be implemented using semiconductor manufacturing techniques during fabrication of the memory chips. In this example, each of MMCs 361, 371, and 381 may be coupled via a bus 351 to memory controller 318. Each MMC may be responsible, among other things, for collecting temperature sensor values from each of the respective memory chips. Memory controller 318 may obtain temperature related information from a respective MMC corresponding to each of memory modules 360, 370, and 380. Alternatively, each of MMCs 361, 371, and 381 may periodically provide the temperature related information to memory controller 318 or another controller, which could then store the information in a manner that it is accessible to a hypervisor associated with the host server.

Still referring to FIG. 3, in one example, the collected temperature values may be stored in control/status registers or other types of memory structures accessible to CPU(s) 312. In this example, memory controller may maintain a temperature profile for memory modules 360, 370, and 380. An example temperature profile may include information concerning the most recently measured value of the temperature of each of the memory chips associated with each of the memory modules. In one example, the hypervisor may control a scanning of the temperature profile such that updated information may be accessible to the hypervisor on a periodic basis. The temperature profile may also include relative differences in temperatures compared with a baseline. Thus, in this example, memory chips may have a temperature that is lower or higher than the baseline temperature. The relative temperature difference among memory chips may be as much ten degrees Celsius or more, CPU(s) 312 may have access to temperature measurements associated with memory chips and less granular data, as needed. The hypervisor associated with the host server may access the temperature profiles for each memory module as part of making memory allocation decisions or as part of redirecting writes to other physical memory locations.

With respect to the access to memory (e.g., DIMMs) associated with the host server, at a broad level, there may be two ways for a compute entity (e.g., a virtual machine (VM)) to access a host server's memory. In those instances, where the VM is accessing the physical memory associated with the CPU it is being executed, then load or store accesses may be translated to the bus transactions by the hardware associated with the system. However, when the VM is provided access to the physical memory associated with a different CPU, then, in one example, the hypervisor may manage this using hardware exceptions caused by an attempted access to unmapped pages. Each hypervisor may be allowed to access host-side page tables or other memory map tables. Access to unmapped pages may cause hardware exceptions, such as page faults. The hypervisor may access the host memory and install page table mappings, after moving the page to the local memory associated with the other host server.

In one example, prior to any such memory operations (or I/O operations) being performed, control information may be exchanged between host servers that are part of a stack or group of servers. The exchange of information may occur between hypervisors (e.g., the hypervisors shown in FIG. 1). To enable live migration each host server may reserve a portion of the total host memory to allow for the VM's restart within the host server. The host server may also be required to keep a certain amount of memory reserved for other purposes, including the stack infrastructure overhead and a resiliency reserve, which may relate to the memory reserved to allow for migration of VMs in case of a lack of availability of another host server due to server failure or other such issues. Thus, at least some of the control information may relate to each host server designating memory space that could be accessed by a virtual machine being executed by another host server to allow for live migration of the VMs. In one example, prior to initiating the live migration, the hypervisor may decide that a temperature of at least a certain number of the memory chips meets or exceeds a temperature threshold. Having so decided, the hypervisor may automatically migrate at least a subset of the compute entities from the host server to a different host server provided at least a temperature of a memory associated with that host server does not meet or exceed the temperature threshold. As part of this process, apart from ensuring the live migration to a cooler DIMM, the hypervisor may also ensure that there is enough physical memory in the other host server to allow for the live migration to occur.

Still referring to FIG. 3, in one example, as part of host server 300, loads and stores may be performed using remote direct memory access (RDMA). RDMA may allow copying of the data directly from the memory of one system (e.g., host server 110 of FIG. 1) into that of another (e.g., host server 120 of FIG. 1) without any involvement of either system's operating system. This way, host servers that support RDMA may achieve the zero-copy benefit by transferring data directly to, or from, the memory space of processes, which may eliminate the extra data copy between the application memory and the data buffers in the operating system. In other words, in this example, by using address translation/mapping across the various software/hardware layers, only one copy of the data may be stored in a memory (or an I/O device) associated with the host server.

With continued reference to FIG. 3, as needed, a temperature profile of SSDs coupled via the PCIe bus may also be monitored and data corresponding to VMs may be stored in cooler SSDs. As described earlier, bus 321 may correspond to PCIe busses capable of functioning in accordance with the PCIe specification, including with support for non-transparent bridging, as needed. The PCIe transactions may be routed using address routing, ID-based routing (e.g., using bus, device, and function numbers), or implicit routing using messages. The transaction types may include transactions associated with memory read/write, I/O read/write, configuration read/write, and messaging operations. The endpoints of the PCIe system may be configured using base address registers (BARS). The type of BAR may be configured as a BAR for memory operations or I/O operations. Other set up and configuration may also be performed, as needed. The hardware associated with the PCIe system (e.g., any root complexes, and ports) may further provide functionality to enable the performance of the memory read/write operations and I/O operations. As an example, address translation logic associated with the PCIe system may be used for address translation for packet processing, including packet forwarding or packet dropping.

In one example, a hypervisor executing on host server 300 may map a memory region associated with an SSD associated with host server 300 into the guest address space of a virtual machine executing using CPU(s) 312. When a loading of data is needed by the VM, the bad may be directly translated into a PCIe transaction. For a store operation, PCIe controller 316 may transmit the PCIe packets to P2P controller 322 which then may send it to any of P2P ports 328, 330, or 332. This way data may be stored in an I/O device (e.g., an SSD, an HD, or other I/O devices), which is associated with host server 300. The forwarding may also include address translation by the PCIe system. Although FIG. 3 shows host server 300 as including a certain number of components arranged and coupled in a certain way, it may include fewer or additional components arranged and coupled differently. In addition, the functionality associated with host server 300 may be distributed or combined, as needed. As an example, although FIG. 3 shows P2P ports to enable the performance of I/O operations, other types of interconnects may also be used to enable such functionality. Alternatively, and/or additionally, any access operations to SSDs associated with the virtual machines being executed by CPU(s) 312 may be enabled using Remote Direct Memory Access (RDMA).

Figure 4:
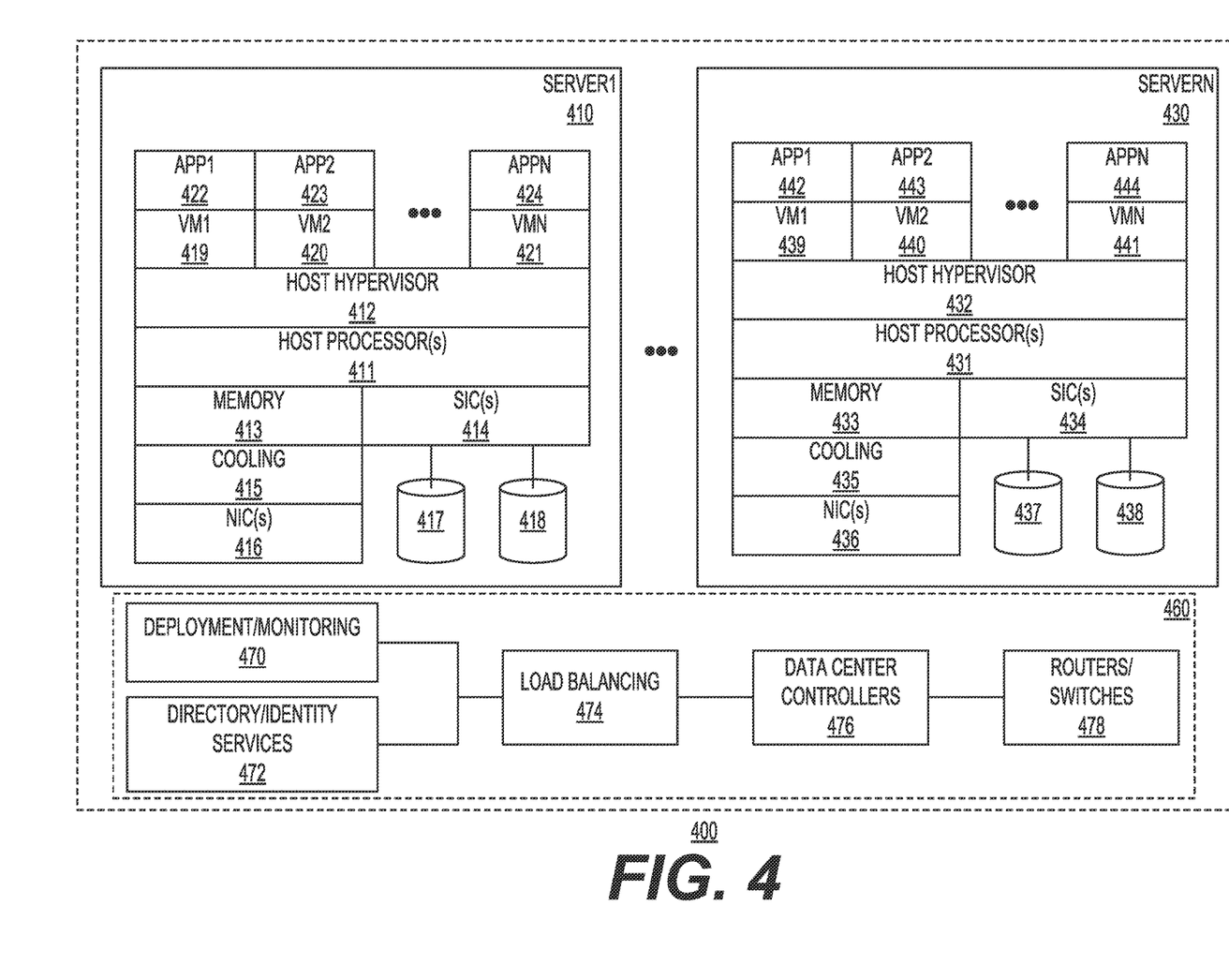
FIG. 4 shows a system environment for implementing a system for controlling memory allocation and data writes in accordance with one example.

FIG. 4 shows a system environment 400 for implementing systems and methods in accordance with one example. In this example, system environment 400 may correspond to a portion of a data center. As an example, the data center may include several clusters of racks including platform hardware, such as server nodes, storage nodes, networking nodes, or other types of nodes. Server nodes may be connected to switches to form a network. The network may enable connections between each possible combination of switches. System environment 400 may include server1 410 and serverN 430. System environment 400 may further include data center related functionality 460, including deployment/monitoring 470, directory/identity services 472, load balancing 474, data center controllers 476 (e.g., software defined networking (SDN) controllers and other controllers), and routers/switches 478. Server1 410 may include host processor(s) 411, host hypervisor 412, memory 413, storage interface controller(s) (SIC(s)) 414, cooling 415 (e.g., cooling fans or other cooling apparatus), network interface controller(s) (NIC(s)) 416, and storage disks 417 and 418. ServerN 430 may include host processor(s) 431, host hypervisor 432, memory 433, storage interface controller(s) (SIC(s)) 434, cooling 435 (e.g., cooling fans or other cooling apparatus), network interface controller(s) (NIC(s)) 436, and storage disks 437 and 438. Server1 410 may be configured to support virtual machines, including VM1 419, VM2 420, and VMN 421. The virtual machines may further be configured to support applications, such as APP1 422, APP2 423, and APPN 424. ServerN 430 may be configured to support virtual machines, including VM1 439, VM2 440, and VMN 441. The virtual machines may further be configured to support applications, such as APP1 442, APP2 443, and APPN 444.

With continued reference to FIG. 4, in one example, system environment 400 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 4 shows system environment 400 as including a certain number of components arranged and coupled in a certain way, it may include fewer or additional components arranged and coupled differently. In addition, the functionality associated with system environment 400 may be distributed or combined, as needed. Moreover, although FIG. 4 describes the access to the unused resources by VMs, other types of compute entities, such as containers, micro-VMs microservices, and unikernels for serverless functions, may access the unused resources associated with the host server in a like manner.

Figure 5:
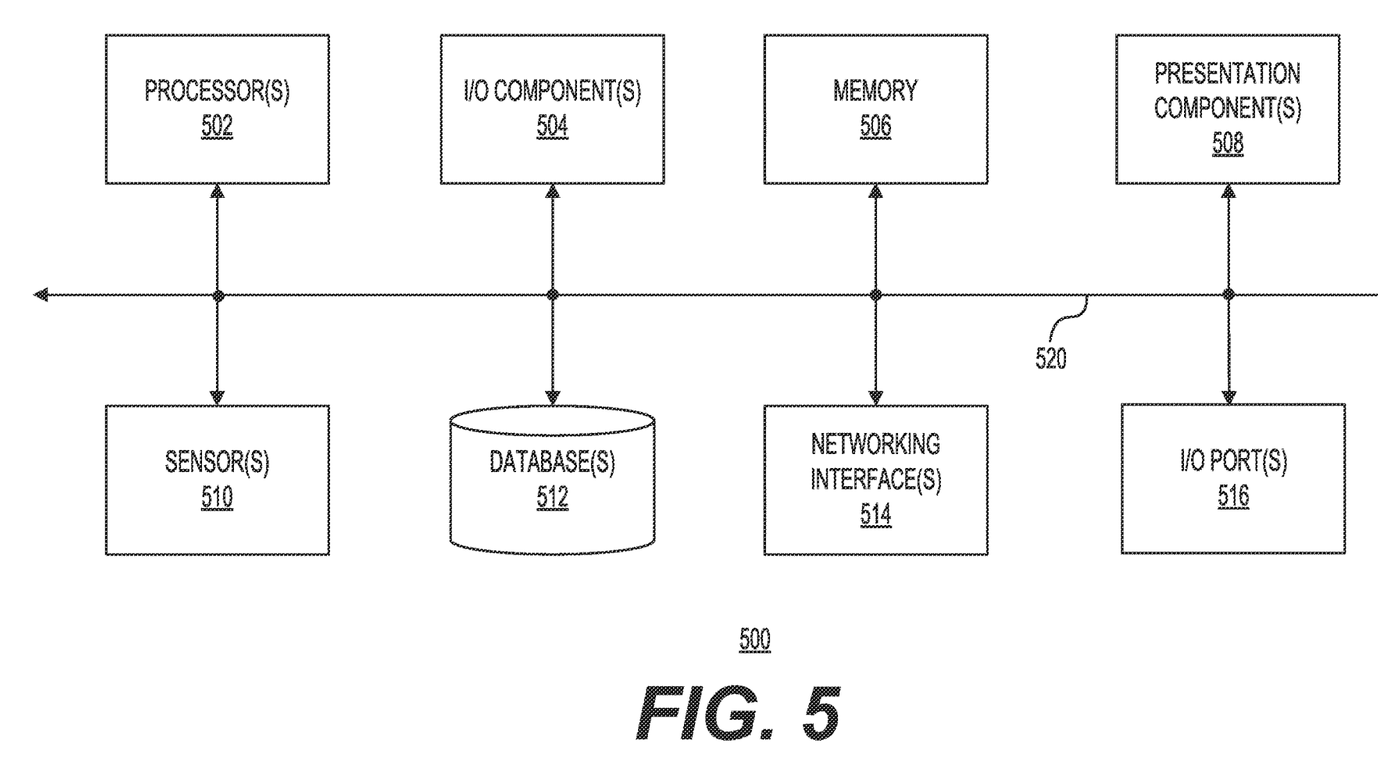
FIG. 5 shows a computing platform that may be used for performing certain methods in accordance with one example.

FIG. 5 shows a block diagram of a computing platform 500 (e.g., for implementing certain aspects of the methods and algorithms associated with the present disclosure) in accordance with one example. Computing platform 500 may include a processor(s) 502, I/O component(s) 504, memory 506, presentation component(s) 508, sensor(s) 510, database (s) 512, networking interface(s) 514 and I/O Port(s), which may be interconnected via bus 520. Processor(s) 502 may execute instructions stored in memory 506. I/O component (s) 504 may include user interface devices such as a keyboard, a mouse, a voice recognition processor, or touch screens. Memory 506 may be any combination of non-volatile storage or volatile storage (e.g., flash memory, DRAM, SRAM, or other types of memories). Presentation component(s) 508 may be any type of display, such as LCD, LED, or other types of display. Sensor(s) 510 may include telemetry or other types of sensors configured to detect, and/or receive, information (e.g., conditions associated with the devices). Sensor(s) 510 may include sensors configured to sense conditions associated with CPUs, memory or other storage components, FPGAs, motherboards, baseboard management controllers, or the like. Sensor(s) 510 may also include sensors configured to sense conditions associated with racks, chassis, fans, power supply units (PSUs), or the like. Sensors 510 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

With continued reference to FIG. 5, sensor(s) 510 may be implemented in hardware, software, or a combination of hardware and software. Some sensor(s) 510 may be implemented using a sensor API that may allow sensor(s) 510 to receive information via the sensor API. Software configured to detect or listen to certain conditions or events may communicate via the sensor API any conditions associated with devices that are part of the data center or other like systems. Remote sensors or other telemetry devices may be incorporated within the data centers to sense conditions associated with the components installed therein. Remote sensors or other telemetry may also be used to monitor other adverse signals in the data center. As an example, if fans that are cooling a rack stop working then that may be read by the sensors and reported to the deployment and monitoring functions. This type of monitoring may ensure that any impact on the temperature profile-based redirecting of memory writes is detected, recorded, and corrected, as needed.

Still referring to FIG. 5, database(s) 512 may be used to store records related to the temperature profiles for redirecting of memory writes and the migration of VMs, including policy records establishing which host servers may implement such functionality. In addition, database(s) 512 may also store data used for generating reports related to the redirecting of memory writes and migration of VMs based on the temperature profiles.

Networking interface(s) 514 may include communication interfaces, such as Ethernet, cellular radio, Bluetooth radio, UWB radio, or other types of wireless or wired communication interfaces. I/O port(s) may include Ethernet ports, InfiniBand ports, Fiber Optic port(s), or other types of ports. Although FIG. 5 shows computing platform 500 as including a certain number of components arranged and coupled in a certain way, it may include fewer or additional components arranged and coupled differently. In addition, the functionality associated with computing platform 500 may be distributed, as needed.

Figure 6:
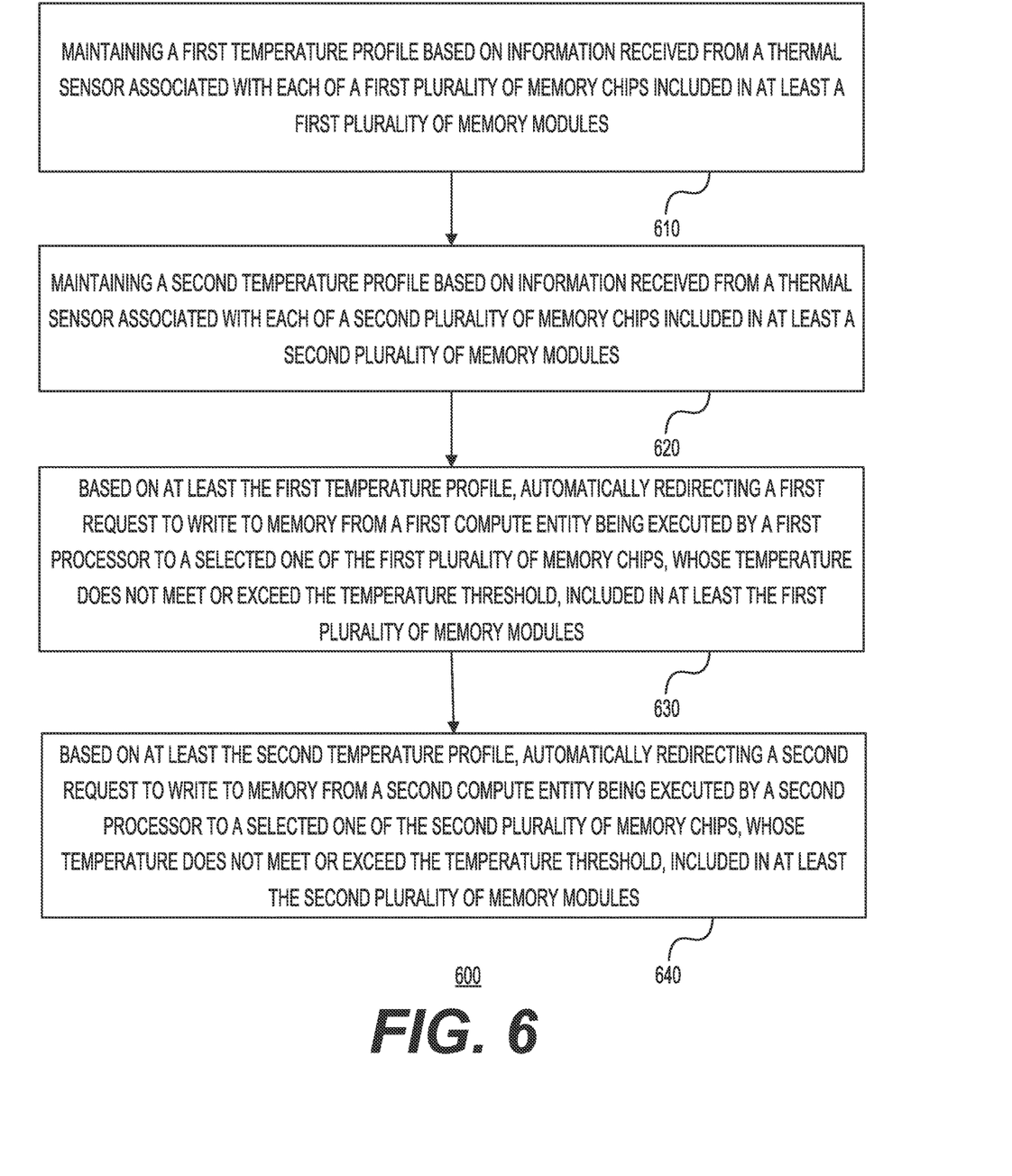
FIG. 6 shows a flowchart of a method in accordance with one example.

FIG. 6 shows a flowchart 600 of a method in accordance with one example. In this example, this method may be performed in a cloud computing system including a host server, where the host server comprises at least a first plurality of memory modules coupled to a first processor and at least a second plurality of memory modules coupled to a second processor. As an example, this method may be performed as part of a host server 300 of FIG. 3 as part of system 100 of FIG. 1. Step 610 may include maintaining a first temperature profile based on information received from a thermal sensor associated with each of a first plurality of memory chips included in at least the first plurality of memory modules. As an example, the first temperature profile may correspond to temperature data associated with memory chips included as part of one of the memory modules described earlier (e.g., one of memory modules 360, 370, and 380 of FIG. 3). In one example, the hypervisor associated with the host server may manage the first temperature profile.

Step 620 may include maintaining a second temperature profile based on information received from a thermal sensor associated with each of a second plurality of memory chips included in at least the second plurality of memory modules. As an example, the second temperature profile may correspond to temperature data associated with memory chips included as part of one of the other memory modules described earlier (e.g., one of memory modules 360, 370, and 380 of FIG. 3). In one example, the hypervisor associated with the host server may manage the second temperature profile. In addition, the hypervisor may also periodically initiate a temperature scan for updating at least one of the first temperature profile or the second temperature profile. As explained earlier, either push or pull (or both in some combination) techniques may be used for updating the temperature profiles. Instructions corresponding to the hypervisor and related modules may be stored in a memory, including, as needed in memory 506 associated with computing platform 500, as needed.

Step 630 may include, based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules. In one example, the hypervisor associated with the host server may help automatically redirect the memory write operations. The CPU initiating the write operation may write to the physical memory, with the help of memory controllers (e.g., the memory controllers described earlier with respect to FIG. 3), based on memory mapping tables maintained by the hypervisor for managing the host server's memory. Instructions corresponding to the hypervisor and related modules may be stored in a memory, including, as needed in memory 506 associated with computing platform 500.

Step 640 may include, based on at least the second temperature profile, automatically redirecting a second request to write to memory from a second compute entity being executed by the second processor to a selected one of the second plurality of memory chips, whose temperature does not meet or exceed the temperature threshold, included in at least the second plurality of memory modules. In one example, the hypervisor associated with the host server may help automatically redirect the memory write operations. The CPU initiating the write operation may write to the physical memory, with the help of memory controllers (e.g., the memory controllers described earlier with respect to FIG. 3), based on memory mapping tables maintained by the hypervisor for managing the host server's memory. Instructions corresponding to the hypervisor and related modules may be stored in a memory, including, as needed in memory 506 associated with computing platform 500. Although FIG. 6 describes flow chart 600 as including a certain number of steps being executed in a certain order, the method may include additional or fewer steps executed in a different order. As an example, the hypervisor may periodically initiate a temperature scan for updating at least one of the first temperature profile or the second temperature profiles. Moreover, the hypervisor may quarantine a memory module (e.g., any of the memory modules, including DIMMs described earlier), selected from at least one of the first memory modules or the second memory modules, based on an analysis of the first temperature profile and the second temperature profile if the memory module includes K number of memory chips, where K is a positive integer, having a temperature in excess of a temperature threshold during an entirety of a predetermined time frame or for a selected number of times during the entirety of the predetermined time frame. Finally, the hypervisor may keep track of a metric related to a use of each of the first plurality of memory modules and the second memory modules by compute entities to prevent overuse of a particular memory module relative to other memory modules. As an example, the metric related to the use of memory modules may relate to the number of times different memory modules were accessed in a predetermined time frame. A histogram may also be used to bin the memory modules experiencing overuse.

FIG. 7 shows another flowchart 700 of a method in accordance with one example. In this example, this method may be performed in a cloud computing system including a first host server and a second host server, wherein the first host server comprises at least a first plurality of memory modules coupled to a first processor and at least a second plurality of memory modules coupled to a second processor, wherein the second host server comprises at least a third plurality of memory modules coupled to a third processor and at least a fourth plurality of memory modules coupled to a fourth processor, wherein the first host server comprises a first hypervisor for managing a first plurality of compute entities for execution by the first processor or the second processor and the second host server comprises a second hypervisor for managing a second plurality of compute entities for execution by the third processor or the fourth processor. In this example, this method may be performed in a host server 300 of FIG. 3 as part of system 100 of FIG. 1.

Step 710 may include maintaining a first temperature profile based on information received from a thermal sensor associated with each of a first plurality of memory chips included in at least the first plurality of memory modules and at least the second plurality of memory modules. As an example, the first temperature profile may correspond to temperature data associated with memory chips included as part of the memory modules described earlier (e.g., memory modules 360, 370, and 380 of FIG. 3). In one example, the hypervisor associated with the host server may manage the first temperature profile.

Step 720 may include maintaining a second temperature profile based on information received from a thermal sensor associated with each of a second plurality of memory chips included in at least the third plurality of memory modules and at least the fourth plurality of memory modules. As an example, the second temperature profile may correspond to temperature data associated with memory chips included as part of other memory modules described earlier (e.g., one of memory modules 360, 370, and 380 of FIG. 3). In one example, the hypervisor associated with the host server may manage the second temperature profile. In addition, the hypervisor may also periodically initiate a temperature scan for updating at least one of the first temperature profile or the second temperature profile. As explained earlier, either push or pull (or both in some combination) techniques may be used for updating the temperature profiles.

Step 730 may include, based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules and at least the second plurality of memory modules. In one example, the hypervisor associated with the host server may help automatically redirect the memory write operations. The CPU initiating the write operation may write to the physical memory, with the help of the memory controllers (e.g., the memory controllers described earlier with respect to FIG. 3), based on memory mapping tables maintained by the hypervisor for managing the host server's memory.

Step 740 may include, based on at least the second temperature profile, automatically redirecting a second request to write to memory from a second compute entity being executed by the second processor to a selected one of the second plurality of memory chips, whose temperature does not meet or exceed the temperature threshold, included in at least the third plurality of memory modules and the fourth plurality of memory modules. In one example, the hypervisor associated with the host server may help automatically redirect the memory write operations. The CPU initiating the write operation may write to the physical memory, with the help of memory controllers (e.g., the memory controllers described earlier with respect to FIG. 3), based on memory mapping tables maintained by the hypervisor for managing the host server's memory.

Step 750 may include upon determining a temperature of at least N of the first plurality of memory chips meets or exceeds a temperature threshold, where N is a positive integer, automatically migrating at least a subset of the first compute entities from the first host server to the second host server provided at least a temperature of at least one memory chip from among the second plurality of memory chips does not meet or exceed the temperature threshold. As described earlier, with respect to FIG. 3, live migration of compute entities (e.g, VMs) may be performed by coordination between the hypervisors associated with the two host servers (e.g. the host server from which the VM is being migrated away from and the host server to which the VM is being migrated to). Although FIG. 7 describes flow chart 700 as including a certain number of steps being executed in a certain order, the method may include additional steps executed in a different order. As an example, the hypervisor upon determining a temperature of at least O of the second plurality of memory chips meets or exceeds a temperature threshold, where O is a positive integer, may automatically migrate at least a subset of the first compute entities from the second host server to the first host server provided at least a temperature of at least one memory chip from among the first plurality of memory chips does not meet or exceed the temperature threshold. In other words, VMs may be migrated from one host server to another and then back to the same host server if the temperature profiles change.

In conclusion, the present disclosure relates to a method in a cloud computing system including a host server, where the host server comprises at least a first plurality of memory modules coupled to a first processor and at least a second plurality of memory modules coupled to a second processor. The method may include maintaining a first temperature profile based on information received from a thermal sensor associated with each of a first plurality of memory chips included in at least the first plurality of memory modules. The method may further include maintaining a second temperature profile based on information received from a thermal sensor associated with each of a second plurality of memory chips included in at least the second plurality of memory modules. The method may further include based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules. The method may further include based on at least the second temperature profile, automatically redirecting a second request to write to memory from a second compute entity being executed by the second processor to a selected one of the second plurality of memory chips, whose temperature does not meet or exceed the temperature threshold, included in at least the second plurality of memory modules.

The host server may include a hypervisor for managing a plurality of compute entities for execution by the first processor or the second processor, and the hypervisor may be configured to maintain both the first temperature profile and the second temperature profile. The method may further include the hypervisor periodically initiating a temperature scan for updating at least one of the first temperature profile or the second temperature profile.

The method may include the hypervisor quarantining a memory module, selected from at least one of the first memory modules or the second memory modules, based on an analysis of the first temperature profile and the second temperature profile if the memory module includes K number of memory chips, where K is a positive integer, having a temperature in excess of a temperature threshold during an entirety of a predetermined time frame or for a selected number of times during the entirety of the predetermined time frame. The method may further include the hypervisor keeping track of a metric related to a use of each of the first plurality of memory modules and the second memory modules by compute entities to prevent overuse of a particular memory module relative to other memory modules.

The method may further include managing a mapping between a virtual memory allocated to a compute entity and a physical memory. Each of the first compute entity and the second compute entity may comprise at least one of a virtual machine (VM), a micro-VM, a microservice, or a unikernel for serverless functions.

In yet another aspect, the present disclosure relates to a system including a host server comprising at least a first plurality of memory modules coupled to a first processor and at least a second plurality of memory modules coupled to a second processor. The system may further include a hypervisor, associated with the host server. The hypervisor may be configured to: (1) maintain a first temperature profile based on information received from a thermal sensor associated with each of a first plurality of memory chips included in at least the first plurality of memory modules, (2) maintain a second temperature profile based on information received from a thermal sensor associated with each of a second plurality of memory chips included in at least the second plurality of memory modules, (3) based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules, and (4) based on at least the second temperature profile, automatically redirecting a second request to write to memory from a second compute entity being executed by the second processor to a selected one of the second plurality of memory chips, whose temperature does not meet or exceed the temperature threshold, included in at least the second plurality of memory modules.

The hypervisor may further be configured to periodically initiate a temperature scan for updating at least one of the first temperature profile or the second temperature profile. The hypervisor may further be configured to quarantine a memory module, selected from at least one of the first memory modules or the second memory modules, by analyzing the first temperature profile and the second temperature profile to determine whether the memory module includes at least a K number of memory chips, where K is a positive integer, having a temperature in excess of a temperature threshold during an entirety of a predetermined time frame or for a selected number of times during the entirety of the predetermined time frame.

The hypervisor may further be configured to keep track of a metric related to a use of each of the first plurality of memory modules and the second memory modules by compute entities to prevent overuse of a particular memory module relative to other memory modules. The hypervisor may further be configured to manage a mapping between a virtual memory allocated to a compute entity and a physical memory corresponding to the virtual memory. Each of the first compute entity and the second compute entity may comprise at least one of a virtual machine (VM), a micro-VM, a microservice, or a unikernel for serverless functions.

In another aspect, the present disclosure relates to a method in a cloud computing system including a first host server and a second host server, where the first host server comprises at least a first plurality of memory modules coupled to a first processor and at least a second plurality of memory modules coupled to a second processor, where the second host server comprises at least a third plurality of memory modules coupled to a third processor and at least a fourth plurality of memory modules coupled to a fourth processor, where the first host server comprises a first hypervisor for managing a first plurality of compute entities for execution by the first processor or the second processor and the second host server comprises a second hypervisor for managing a second plurality of compute entities for execution by the third processor or the fourth processor. The method may include maintaining a first temperature profile based on information received from a thermal sensor associated with each of a first plurality of memory chips included in at least the first plurality of memory modules and at least the second plurality of memory modules. The method may further include maintaining a second temperature profile based on information received from a thermal sensor associated with each of a second plurality of memory chips included in at least the third plurality of memory modules and at least the fourth plurality of memory modules. The method may further include based on at least the first temperature profile, automatically redirecting a first request to write to memory from a first compute entity being executed by the first processor to a selected one of the first plurality of memory chips, whose temperature does not meet or exceed the temperature threshold, included in at least the first plurality of memory modules and at least the second plurality of memory modules. The method may further include based on at least the second temperature profile, automatically redirecting a second request to write to memory from a second compute entity being executed by the second processor to a selected one of the second plurality of memory chips, whose temperature does not meet or exceed the temperature threshold, included in at least the third plurality of memory modules and the fourth plurality of memory modules. The method may further include upon determining a temperature of at least N of the first plurality of memory chips meets or exceeds a temperature threshold, wherein N is a positive integer, automatically migrating at least a subset of the first compute entities from the first host server to the second host server provided at least a temperature of at least one memory chip from among the second plurality of memory chips does not meet or exceed the temperature threshold.

The method may further include upon determining a temperature of at least O of the second plurality of memory chips meets or exceeds a temperature threshold, wherein O is a positive integer, automatically migrating at least a subset of the first compute entities from the second host server to the first host server provided at least a temperature of at least one memory chip from among the first plurality of memory chips does not meet or exceed the temperature threshold. The method may further include the first hypervisor periodically initiating a temperature scan for updating the first temperature profile and the second hypervisor periodically initiating a temperature scan for updating the second temperature profile.

The method may further include the first hypervisor quarantining a memory module, selected from at least one of the first memory modules or the second memory modules, by analyzing the first temperature profile to determine whether the memory module includes at least a K number of memory chips, wherein K is a positive integer, having a temperature in excess of a temperature threshold during an entirety of a predetermined time frame or for a selected number of times during the entirety of the predetermined time frame. The method may further include the second hypervisor quarantining a memory module, selected from at least one of the third memory modules or the fourth memory modules, by analyzing the second temperature profile to determine whether the memory module includes at least a K number of memory chips, where K is a positive integer, having a temperature in excess of a temperature threshold during an entirety of a predetermined time frame or for a selected number of times during the entirety of the predetermined time frame.

The method may further include the first hypervisor keeping track of a metric related to a use of each of the first plurality of memory modules and the second memory modules by compute entities to prevent overuse of a particular memory module relative to other memory modules. The method may further include the second hypervisor keeping track of a metric related to a use of each of the third plurality of memory modules and the fourth memory modules by compute entities to prevent overuse of a particular memory module relative to other memory modules.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or an, as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a cloud computing system including a first host server and a second host server, wherein the first host server comprises at least a first plurality of memory modules coupled to a first processor and at least a second plurality of memory modules coupled to a second processor, wherein the first plurality of memory modules includes a first plurality of memory chips and the second plurality of memory modules includes a second plurality of memory chips, wherein the second host server comprises at least a third plurality of memory modules coupled to a third processor and at least a fourth plurality of memory modules coupled to a fourth processor, and wherein the first host server comprises a first hypervisor for managing a first plurality of compute entities for execution by the first processor or the second processor and the second host server comprises a second hypervisor for managing a second plurality of compute entities for execution by the third processor or the fourth processor, the method comprising:

maintaining, by the first hypervisor, a first temperature profile based on information received from one or more thermal sensors associated with the first plurality of memory modules;

maintaining, by the first hypervisor, a second temperature profile based on information received from one or more thermal sensors associated with the second plurality of memory modules;

based on at least the first temperature profile, the first hypervisor automatically redirecting a first memory write request, received from a first compute entity being executed by the first processor, to a selected one of the first plurality of memory chips;

based on at least the second temperature profile, the first hypervisor automatically redirecting a second memory write request, received from a second compute entity being executed by the second processor, to a selected one of the second plurality of memory chips; and upon determining each of the first temperature profile and the second temperature profile meets a criterion associated with a change in temperature data associated with at least one of the first plurality of memory modules or the second plurality of memory modules, the first hypervisor automatically migrating at least a subset of the first compute entities from the first host server to the second host server provided, based on an exchange of information between the first hypervisor and the second hypervisor, a determination is made that the second host server has sufficient memory to allow for live migration to occur.

2. The method of claim 1, wherein the third plurality of memory modules includes a third plurality of memory chips and the fourth plurality of modules includes a fourth plurality of memory chips, further comprising the first hypervisor and the second hypervisor exchanging control information to determine whether the third plurality of memory chips or the fourth plurality of memory chips have enough physical memory to allow for live migration to occur.

3. The method of claim 1, further comprising the first hypervisor periodically initiating a temperature scan for updating at least one of the first temperature profile or the second temperature profile.

4. The method of claim 1, further comprising the first hypervisor quarantining a memory module, selected from at least one of the first plurality of memory modules or the second plurality of memory modules, based on an analysis of the first temperature profile or the second temperature profile.

5. The method of claim 1, further comprising the first hypervisor keeping track of a metric related to a use of each of the first plurality of memory modules and the second plurality of memory modules to prevent overuse of a particular memory module relative to other memory modules.

6. The method of claim 1, further comprising managing a mapping between a virtual memory allocated to a compute entity and a physical memory.

7. The method of claim 1, wherein each of the first compute entity and the second compute entity comprises at least one of a virtual machine (VM), a micro-VM, a micro-service, or a unikernel for serverless functions.

8. A system comprising:
a first host server and a second host server, wherein the first host server comprises at least a first plurality of memory modules coupled to a first processor and at least a second plurality of memory modules coupled to a second processor, wherein the first plurality of memory modules includes a first plurality of memory chips and the second plurality of memory modules includes a second plurality of memory chips, wherein the second host server comprises at least a third plurality of memory modules coupled to a third processor and at least a fourth plurality of memory modules coupled to a fourth processor; and wherein the first host server comprises a first hypervisor for managing a first plurality of compute entities for execution by the first processor or the second processor and the second host server comprises a second hypervisor for managing a second plurality of compute entities for execution by the third processor or the fourth processor;
a first hypervisor, associated with the first host server, configured to:
 manage a first plurality of compute entities for execution by the first processor or the second processor,
 maintain a first temperature profile based on information received from one or more thermal sensors associated with the first plurality of memory modules, and
 maintain a second temperature profile based on information received from one or more thermal sensors associated with the second plurality of memory modules; and
a second hypervisor, associated with the second host server, configured to manage a second plurality of compute entities for execution by the third processor or the fourth processor; and
wherein the first hypervisor is further configured to:
 based on at least the first temperature profile, automatically redirect a first memory write request, received from a first compute entity being executed by the first processor, to a selected one of the first plurality of memory chips,
 based on at least the second temperature profile, automatically redirect a second memory write request, received from a second compute entity being executed by the second processor, to a selected one of the second plurality of memory chips, and
 upon determining each of the first temperature profile and the second temperature profile meets a criterion associated with a change in temperature data associated with at least one of the first plurality of memory modules or the second plurality of memory modules, automatically migrate at least a subset of the first compute entities from the first host server to the second host server provided, based on an exchange of information between the first hypervisor and the second hypervisor, a determination is made that the second host server has sufficient memory to allow for live migration to occur.

9. The system of claim 8, wherein the first hypervisor is further configured to periodically initiate a temperature scan for updating at least one of the first temperature profile or the second temperature profile.

10. The system of claim 8, wherein the first hypervisor is further configured to quarantine a memory module, selected from at least one of the first memory modules or the second memory modules, by analyzing the first temperature profile or the second temperature profile.

11. The system of claim 8, wherein the first hypervisor is further configured to keep track of a metric related to a use of each of the first plurality of memory modules and the second memory modules to prevent overuse of a particular memory module relative to other memory modules.

12. The system of claim 8, wherein the first hypervisor is further configured to manage a mapping between a virtual memory allocated to a compute entity and a physical memory corresponding to the virtual memory.

13. The system of claim 8, wherein each of the first compute entity and the second compute entity comprises at least one of a virtual machine (VM), a micro-VM, a micro-service, or a unikernel for serverless functions.

14. A method in a cloud computing system including a first host server and a second host server, wherein the first host server comprises at least a first plurality of memory modules coupled to a first processor and at least a second plurality of memory modules coupled to a second processor, wherein the first plurality of memory modules includes a first plurality of memory chips and the second plurality of memory modules includes a second plurality of memory chips, wherein the second host server comprises at least a third plurality of memory modules coupled to a third processor and at least a fourth plurality of memory modules coupled to a fourth processor, and wherein the first host server comprises a first hypervisor for managing a first plurality of compute entities for execution by the first processor or the second processor and the second host server comprises a second hypervisor for managing a second plurality of compute entities for execution by the third processor or the fourth processor, the method comprising:
 maintaining, by the first hypervisor, a first temperature profile based on information received from one or more thermal sensors associated with the first plurality of memory modules;
 maintaining, by the first hypervisor, a second temperature profile based on information received from one or more thermal sensors associated with the second plurality of memory modules;
 based on at least the first temperature profile, the first hypervisor automatically redirecting a first memory write request, received from a first compute entity being executed by the first processor, to a selected one of the first plurality of memory chips;
 based on at least the second temperature profile, the first hypervisor automatically redirecting a second memory write request, received from a second compute entity being executed by the second processor, to a selected one of the second plurality of memory chips;
 upon determining each of the first temperature profile and the second temperature profile meets a criterion associated with a change in temperature data associated with at least one of the first plurality of memory modules or the second plurality of memory modules, the first hypervisor automatically migrating at least a subset of the first compute entities from the first host server to the second host server provided, based on an exchange of information between the first hypervisor and the second hypervisor, a determination is made that the second host server has sufficient memory to allow for live migration to occur; and the first hypervisor keeping track of a first metric related to a use of each of the first plurality of memory modules and the second plurality of memory modules to prevent overuse of a particular memory module relative to other memory modules, and the second hypervisor keeping track of a second metric related to a use of each of the third plurality of memory modules and the fourth memory modules to prevent overuse of a particular ry module relative to other memory modules.

15. The method of claim 14, wherein the third plurality of memory modules includes a third plurality of memory chips and the fourth plurality of modules includes a fourth plurality of memory chips, further comprising the first hypervisor and the second hypervisor exchanging control information to determine whether the third plurality of memory chips or the fourth plurality of memory chips have enough physical memory to allow for live migration to occur.

16. The method of claim 15, further comprising the first hypervisor periodically initiating a temperature scan for updating at least one of the first temperature profile or the second temperature profile.

17. The method of claim 16, further comprising the first hypervisor quarantining a memory module, selected from at least one of the first plurality of memory modules or the second plurality of memory modules, based on an analysis of the first temperature profile or the second temperature profile.

18. The method of claim 17, wherein the first hypervisor quarantining the memory module by analyzing at least one of the first temperature profile or the second temperature profile to determine whether the criterion associated with the change in the temperature data is met during an entirety of a predetermined time frame or for a selected number of times during the entirety of the predetermined time frame.

19. The method of claim 14, further comprising managing a mapping between a virtual memory allocated to a compute entity and a physical memory.

20. The method of claim 19, wherein each of the first compute entity and the second compute entity comprises at least one of a virtual machine (VM), a micro-VM, a microservice, or a unikernel for serverless functions.

* * * * *